United States Patent [19]

Ott

[11] 3,916,111

[45] Oct. 28, 1975

[54] TELEPHONE RINGER ISOLATOR-RINGING EXTENDER

[75] Inventor: Henry Walter Ott, Fairfield, N.J.

[73] Assignee: Bell Telephone Laboratories, Incorporated, Murray Hill, N.J.

[22] Filed: May 17, 1974

[21] Appl. No.: 470,713

[52] U.S. Cl. .............................................. 179/17 E

[51] Int. Cl.$^2$ .......................................... H04M 3/02

[58] Field of Search ....... 179/17 E, 86, 84 SS, 16 F, 179/18 HB

[56] References Cited

UNITED STATES PATENTS

| | | | |
|---|---|---|---|
| 2,923,776 | 2/1960 | Richards | 179/17 E |
| 3,060,275 | 10/1962 | Meacham et al. | 179/84 VF |
| 3,303,289 | 2/1967 | Hawley et al. | 179/86 |
| 3,829,619 | 8/1974 | Close et al. | 179/18 HB |

*Primary Examiner*—Thomas W. Brown
*Attorney, Agent, or Firm*—Richard B. Havill

[57] ABSTRACT

The invention is a ringer isolator-ringing extender circuit for a multiparty telephone line. The circuit includes a pair of terminals arranged for receiving alternating current signals superimposed on a predetermined potential and a third terminal arranged for connecting with ground. A pair of parallel connected and oppositely poled silicon controlled rectifiers, one of which is arranged for slaved triggering, is interposed between one of the receiving terminals and the third terminal. A threshold circuit connected between the receiving terminals and further connected to a gate electrode of one of the rectifiers prevents conduction through the rectifiers until a signal having predetermined polarity, magnitude and duration is applied between the receiving terminals. The rectifiers are arranged for triggering at a low anode to cathode potential after initial conduction.

7 Claims, 4 Drawing Figures

TELEPHONE RINGER ISOLATOR-RINGING EXTENDER

BACKGROUND OF THE INVENTION

The invention is a telephone line ringer isolator-ringing extender circuit.

Transmission of speech in telephone systems generally is accomplished over telephone lines that extend between individual stations and the central office, which includes switching apparatus for interconnecting the lines.

The telephone lines, strung on the same poles as power lines, are subject to noise problems. Where this occurs, undesirable voltages are induced from the power lines into the telephone lines causing current flow along the telephone lines to any ground connection. Current in each side of the telephone line will be equal if the impedance to ground is equal on each side of the line; however, any impedance imbalance to ground will cause noise currents that are transmitted along the telephone line together with any voice currents.

For multiparty service on a telephone line, the ringer of each station along the line is connected between one of the conductors and ground. While it is possible to have an equal number of ringers connected to each side of the line, impedance imbalance usually exists because of either an unequal number of ringers connected to the two sides or because of the relative location of the ringers on each side of the line.

In a common multiparty telephone ringing system of the full selective type, a number of telephone sets may be connected between each side of the line and ground. If more sets are connected to one side than to the other side causing an imbalance between the sides of the line, balance may be restored by connecting one or more dummy ringers to the side having less ringers connected thereto. This method is an unsatisfactory solution to the problem because it is expensive and it loads down the line.

In the prior art, gas tubes have been used to isolate, or disconnect, the ringer circuit from the path between the line and ground when no ringing signal is impressed upon the line. These gas tubes provide polarity sensitive ringing on four-party and eight-party lines, but they limit ringing range because of a high voltage drop between their anode and cathode electrodes during operation.

Currently, solid state switching circuits are being applied as ringer isolators on two-party lines providing somewhat longer ringing range, but such solid state circuits generally are arranged such that polarity sensitive ringing for four-party selective ringing and eight-party semiselective ringing systems is not possible.

Thus there is a need for a circuit arrangement which will provide ringer isolation and extended ringing range in an arrangement providing polarity sensitive ringing for four-party and eight-party service.

Therefore, it is an object of the invention to develop an improved telephone line ringer isolator-ringing extender.

SUMMARY OF THE INVENTION

This and other objects of the invention are achieved by a ringer isolator-ringing extender circuit for a multiparty telephone line. The circuit includes a pair of terminals arranged for receiving alternating current signals superimposed on a predetermined potential and a third terminal arranged for connecting with ground. A pair of parallel connected and oppositely poled silicon controlled rectifiers, one of which is arranged for slaved triggering, is interposed between one of the receiving terminals and the third terminal. A threshold circuit, connected between the receiving terminals and further connected to the gate of one of the rectifiers, prevents conduction through the rectifiers until a signal having predetermined polarity, magnitude and duration is applied between the receiving terminals.

In an embodiment of the invention, the threshold circuit is arranged for connection between the two sides of a telephone line so that the circuit is responsive to polarized ringing signals applied to the line.

The silicon controlled rectifiers are arranged for triggering at a low anode to cathode potential after initial conduction occurs in response to a ringing signal having the predetermined polarity, magnitude and duration.

A ringer circuit capacitor is connected in series circuit with the pair of silicon controlled rectifiers for blocking direct current from being conducted through the ringer.

Multiple telephone ringers can be operated by the same ringer isolator-ringing extender.

The foregoing and other features may be better understood by reference to the detailed description following when it is considered together with the attached drawings.

DETAILED DESCRIPTION

Figure 1:
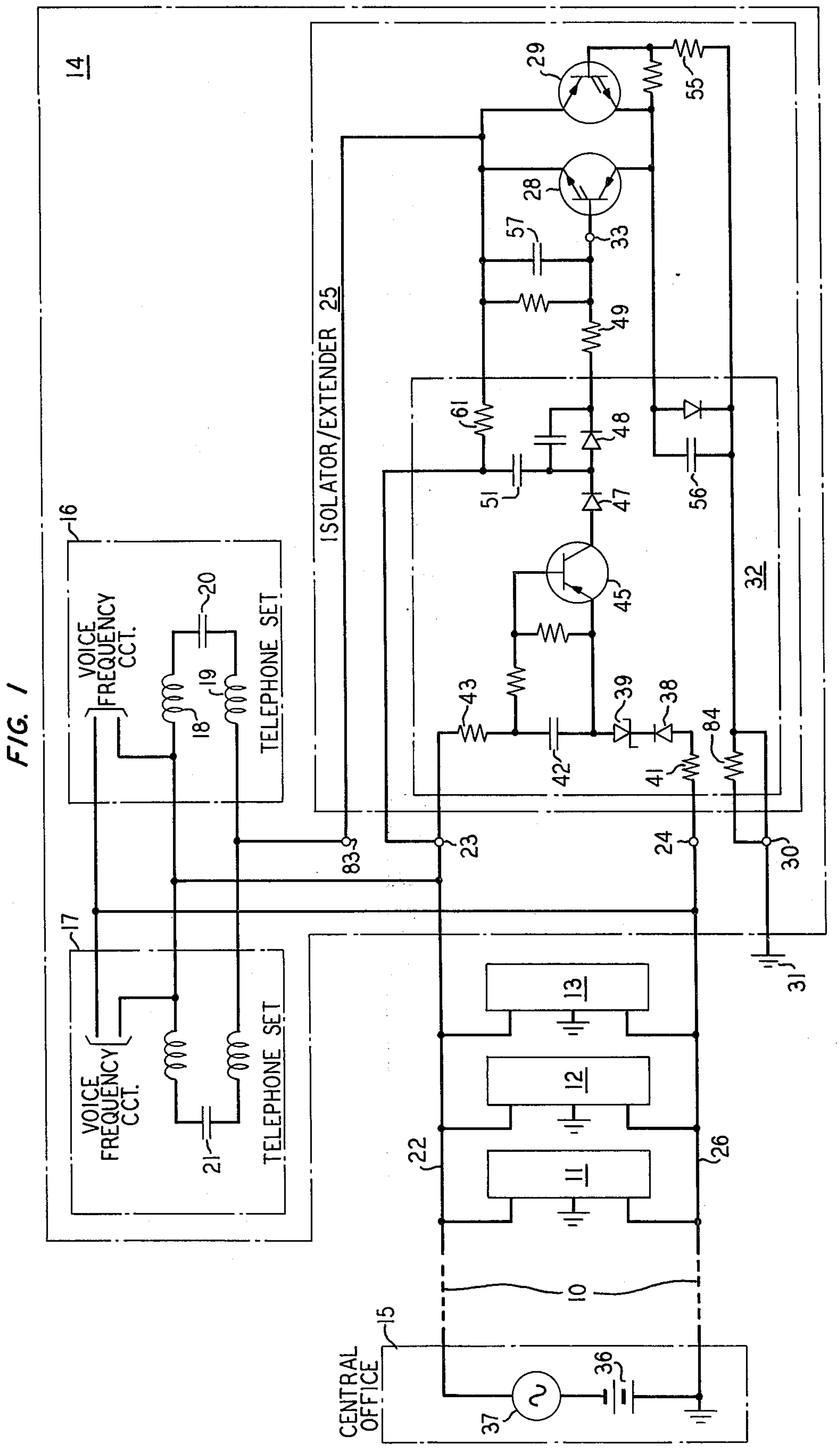
FIG. 1 shows an embodiment of a ringer isolator-ringing extender circuit arranged in accordance with the invention.

Referring now to FIG. 1, there is shown a multiparty telephone line 10 including four stations 11, 12, 13, and 14 connected with a central office 15 and having a capability for full selective ringing. Although the stations 11, 12, 13, and 14 are similar to one another, they are connected to the line 10 so that each responds to a different ringing signal. For example, station 11 responds when an alternating signal is superimposed on a positive polarity potential and applied to a tip lead 26. Station 12 responds when an alternating signal is superimposed on a negative polarity potential and applied to the tip lead 26. Station 13 responds when an alternating signal is superimposed on a positive polarity potential and applied to a ring lead 22. Station 14 responds when an alternating signal is superimposed on a negative polarity potential and applied to the ring lead 22.

Figure 2:
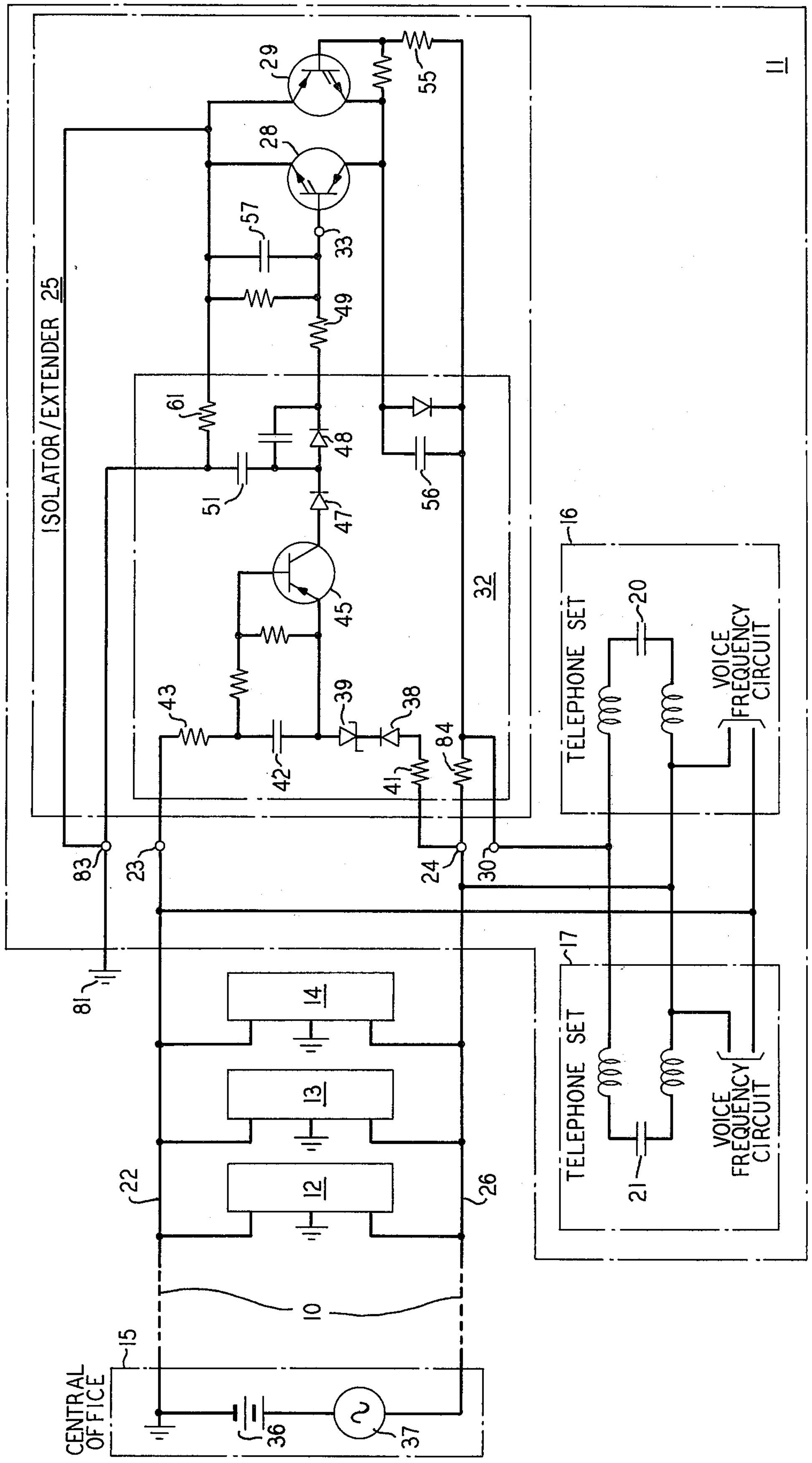
FIG. 2 shows another embodiment of the invention.

Since the circuits of stations 11, 12, 13, and 14 are similar to one another, only the circuit relating to station 14 is shown in detail in FIG. 1. Details of station 11 are shown in FIG. 2 to show one of the alternative ringing arrangements.

The illustrative circuit of station 14 is arranged as a negative ring party. At the station 14, a telephone set 16 includes a pair of ringer coils 18 and 19 connected in a series circuit arrangement with a ringer capacitor 20. One end of this series circuit is connected to the ring lead 22 of the telephone line 10. An additional telephone set 17, which may be located at the station 14, includes a ringer capacitor 21 that also can be connected in a series circuit arrangement to the ring lead 22. Also at the station 14, first and second terminals 23 and 24 of a ringer isolator-ringing extender circuit 25 are connected respectively to the ring lead 22 and the tip lead 26 of the telephone line 10.

The ringer isolator-ringing extender circuit 25 includes a pair of parallel connected silicon controlled rectifiers 28 and 29. These oppositely poled rectifiers are interposed in a series connection with the capacitors 20 and 21 of the ringer circuits of telephone sets 16 and 17 between the first terminal 23 and a third terminal 30 which is connected to a station ground reference potential 31. The oppositely poled rectifiers will conduct alternately.

A threshold trigger circuit 32 is connected between the first and second terminals 23 and 24 and to a gate electrode 33 of the controlled rectifier 28. Because the station 14 is arranged as a negative ring party, the trigger circuit 32 is arranged to selectively detect when an alternating voltage superimposed on a negative polarity potential is applied to the receiving terminals 23 and 24. The circuit 32 prevents conduction through the silicon controlled rectifiers 28 and 29 until the circuit receives a signal of the proper polarity, magnitude and duration.

Figure 3A:
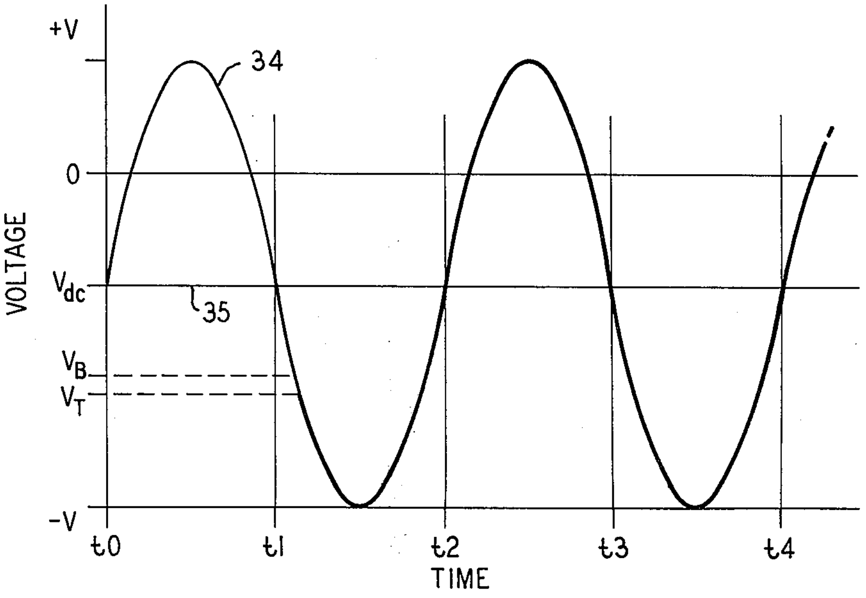
FIGS. 3A and 3B show waveforms which help illustrate the operation of the ringer isolator-ringing extender circuits shown in FIGS. 1 and 2.

In FIG. 3A, there is shown an illustrative superimposed ringing signal for a negative ring party. As shown there, an alternating voltage 34 is superimposed on a negative polarity potential 35. This signal is applied to the threshold trigger circuit 32 from the central office 15 where a battery 36 and a source of alternating voltage 37 connect with the ring and tip leads 22 and 26. For the negative ring party arrangement, the tip lead is grounded in the central office. A forward swing of the ringing signal is the negative portion of the alternating voltage when its polarity is the same as the polarity of the battery potential. A reverse swing occurs during the positive half cycle of the alternating voltage when its polarity is opposed to the polarity of the battery potential.

On any initial reverse swing of the applied ringing signal such as shown between times $t0$ and $t1$ in FIG. 3A, the absolute value of voltage between the ring lead 22 and the tip lead 26 is the difference between the magnitudes of the alternating voltage and the battery potential. The threshold trigger circuit 32 will prevent conduction through the silicon controlled rectifiers 28 and 29 during the initial reverse swing because a diode 38 is reverse biased and cut off. This diode 38 blocks conduction through an input path within the trigger circuit 32. No gate current is supplied to turn on either of the silicon controlled rectifiers 28 and 29.

On any initial forward swing of the ringing signal, such as shown between times $t1$ and $t2$ in FIG. 3A, the absolute value of voltage between the ring lead 22 and the tip lead 26 is the sum of the magnitudes of the alternating voltage and the battery potential. The battery voltage has a magnitude which is approximately one-half the magnitude of the breakdown voltage of the zener diode 39, and the RMS value of the alternating voltage is approximately equal to the breakdown voltage $V_B$ of a zener diode 39. The sum of the battery potential and the alternating voltage has the proper polarity and has sufficient magnitude to initiate conduction through the trigger circuit 32.

Initial current is conducted from ground on the tip lead 26 through a series circuit including a resistor 41, the diode 38, the zener diode 39, a capacitor 42, a resistor 43 and the ring lead 22 to the alternating voltage source 37 and battery 36 in the central office 15.

The capacitor 42 and the resistor 43 form an integrator providing noise immunity. Resistor 43 has a large resistance to keep the trigger current much smaller than the ring trip current of the central office 15. The time constant for the combination of the resistor 43 and the capacitor 42 is large enough to prevent spurious noise from turning on the PNP transistor 45. The capacitor 42, on the other hand, must be small enough that in response to a small trigger current it will develop sufficient voltage for turning on the transistor 45.

The threshold trigger circuit 32 therefore prevents conduction through the silicon controlled rectifiers 28 and 29 until the proper polarity and magnitude of input signals exist for a predetermined duration. The trigger circuit then will turn on at a threshold potential $V_T$, shown in FIG. 3A.

Once the transistor 45 is turned on during the initial forward swing, current is conducted from ground in the central office through the tip lead 26, the resistor 41, diodes 38 and 39, the transistor 45, a collector diode 47, a gate input diode 48, a resistor 49, the gate-cathode circuit of the silicon controlled rectifier 28, the ringer circuit in the telephone sets 16 and 17 and the ring lead 22 back to the central office.

Thus the trigger circuit turns on the silicon controlled rectifier 28 for conducting ringer current from station ground 31 through a capacitor 56, the silicon controlled rectifier 28, the ringer circuit in the telephone sets 16 and 17 and the ring lead 22 to the central office. Conduction of ringer current continues along this path for the remainder of the forward, or negative, swing of the ringing signal, as shown by the emphasized portion of the waveform commencing shortly after time $t1$ and continuing until the superimposed ringing signal reaches ground potential shortly after time $t2$ in FIG. 3A.

During the latter half of the forward swing, just prior to time $t2$, the zener diode 39 is turned off when the sum of the direct current potential and the ringing signal decreases below the breakdown voltage $V_B$ of the zener diode 39.

During the time that the zener diode conducts, capacitors 51 and 56 are charged. Once the zener diode is cut off after the peak of the ringing signal, the diode 48 is reverse biased so that charge stored in capacitor 51 is retained. Diode 48 is reverse biased because terminal 33 is held near ground while the rectifier 28 is conducting and because the anode of the diode 48 is held at a potential that is below ground potential by the reverse breakdown voltage $V_B$ of the zener diode 39. As previously mentioned, conduction through the silicon controlled rectifier 28 continues until the superimposed ringing signal reaches ground potential shortly after time $t2$. At that time, the anode to cathode potential across the silicon controlled rectifier 28 is reduced to zero volt and is cut off.

From this point in time until the ringing signal is terminated, the silicon controlled rectifiers 28 and 29 are turned on alternatively by charge stored in capacitors 51 and 56 respectively. The silicon controlled rectifier 29 is turned on by slaved triggering once the potential in FIG. 3A goes through zero volt to a positive polarity. Charge stored on the capacitor 56 has sufficient magnitude and a proper polarity for biasing the silicon controlled rectifier 29 into conduction by way of a current from capacitor 56 through resistor 55 and the gate to cathode path of the rectifier 29 and back to the capacitor 56. The anode to cathode potential of rectifier 29 provides a forward bias causing the device to conduct throughout the positive swing of the polarized ringing signal. When the sum of the battery potential and the alternating voltage returns to zero volt just prior to time *t*3, the silicon controlled rectifier 29 is cut off.

The silicon controlled rectifier 28 is thereafter turned on by the charge previously stored in capacitor 51. During the entire positive swing, the diode 48 is forward biased; and the capacitor 51 discharges through the diode 48, the resistor 49, the gate to cathode path of the silicon controlled rectifier 28 and the ringer circuits in the telephone sets 16 and 17 to the other side of the capacitor 51. As the ringing signal passes through zero volt just prior to the time *t*3, the capacitor 51 must still retain sufficient charge for triggering the silicon controlled rectifier 28 into conduction commencing at the zero volt crossing of the ringing signal just prior to time *t*3. The silicon controlled rectifier 28 is turned on by the ringing signal as it forward biases the anode to cathode path of the silicon controlled rectifier 28. The rectifier 28 will continue to conduct until the next zero crossing just after the time *t*4.

Ringer circuit capacitors 20 and 21, which are connected in series circuit with the ringer isolator-ringing extender circuit 25, block direct current from the ringer circuits of the telephone sets 16 and 17.

A resistor 61 of the circuit 25 is connected across the ringer circuits for discharging the ringer capacitors 20 and 21 during the silent portion of the ringing cycle. The resistance of resistor 61 is large enough so that only a negligible amount of current is shunted through the resistor whenever the ringing signal is being applied. On the other hand, the resistance of resistor 61 must be small enough to discharge the ringer capacitors 20 and 21 within the shortest silent interval of the ringing signal. During the silent interval, the capacitors 20 and 21 must be discharged sufficiently so that when the ringing signal is reapplied, the silicon controlled rectifier 28 will conduct current through the capacitor 56 to charge that capacitor to a voltage, which will trigger the silicon controlled rectifier 29 when the positive swing of the polarized ringing signal commences.

The embodiment of FIG. 1 provides relatively high longitudinal voltage isolation. It is determined substantially by the breakdown voltage of the silicon controlled rectifiers 28 and 29 because each of their anode to cathode paths is interposed between one side of the telephone line and the station ground 31.

The embodiment of FIG. 1 extends the ringing range for the station 14 with respect to the ringing range of other four-party full select telephone lines. Cold cathode gas tubes, which heretofore have been used in conjunction with such lines, limit ringing range because of a high voltage drop between anode and cathode electrodes during operation. The silicon controlled rectifiers 28 and 29, on the other hand, cause very little voltage drop between their anode and cathode electrodes during operation. This reduction of the isolator voltage drop enables sufficient ringing signal magnitude to be available further along the telephone line for operating the station ringers.

Circuit 25 also provides additional ringing range for telephone lines using a ringer without any other coupling device. Such additional range is available because the longitudinal voltage isolation provided by circuit 25 enables ringers to be made more sensitive without experiencing undesirable bell tap in response to longitudinal voltages.

Referring now to FIG. 2, there is shown in detail the station 11 which includes a ringer isolator-ringing extender circuit 25 like the similarly designated circuit of FIG. 1. Although the station 11 is arranged differently because it is a positive tip party, in FIG. 2 any circuit elements which are similar to those of FIG. 1 are given the same designator.

Figure 3B:
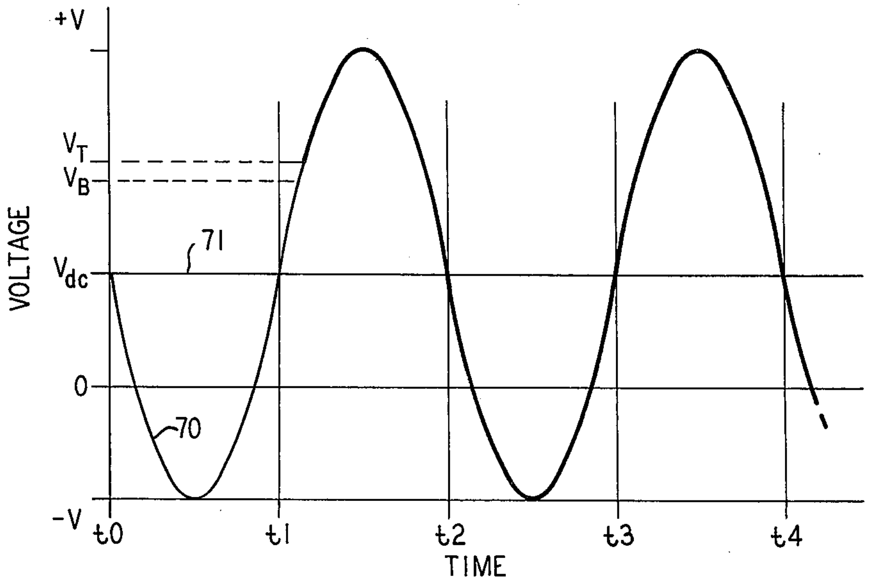

FIG. 3B shows an alternating voltage 70 superimposed upon a positive polarity battery potential 71. The resulting waveform illustrates the ringing signal waveform for the positive tip party arrangement of the station 11 of FIG. 2. The waveform is derived within the central office 15 of FIG. 2 wherein ground is connected to the ring lead 22 on the negative side of the battery 36.

In FIG. 2, the terminals 23 and 24 of the ringer isolator-ringing extender circuit 25 remain connected respectively to the ring and tip leads 22 and 26. The pair of parallel connected and oppositely poled silicon controlled rectifiers 28 and 29 are rearranged so that they are connected in series with ringer capacitors 20 and 21 of the telephone sets 16 and 17 between the terminal 24 and station ground 81 at the terminal 83.

The threshold trigger circuit 32 connects with the terminals 23 and 24 and with the gate electrode of the silicon controlled rectifier 28 for the purpose of preventing conduction through either of the rectifiers 28 and 29 until there is applied a ringing signal having the proper polarity, magnitude and duration, as shown in FIG. 3B. The threshold circuit is arranged so that the applied input signal must have a magnitude and polarity which will break down the zener diode 39 for reverse conduction. Such signal must be maintained long enough to charge the capacitor 42, as in the arrangement of FIG. 1.

In the arrangement of FIG. 2, the ringer isolator-ringing extender 25 functions substantially the same as in the arrangement of FIG. 1 except that it responds to a different polarity of applied ringing signals. Additionally, the ringer circuits of the telephone sets 16 and 17 are not included in series with the trigger circuit 32 when the proper ringing signal is applied.

The embodiment of FIG. 2 provides relatively high longitudinal isolation. Line to ground breakdown is determined either by the breakdown voltage of the silicon controlled rectifiers 28 and 29 or by the breakdown voltage of the zener diode 39 and the transistor 45 or the diode 47 in series with one another between the tip lead 26 and ground 81.

Other than the previously mentioned differences, the circuits of station 11 function substantially the same as the circuits of the station 14 in FIG. 1.

A resistor 84 is connected across the ringer circuit in FIG. 2 for discharging the ringer capacitors 20 and 21 in a manner similar to the discharge of those capacitors through the resistor 61, as described in connection with FIG. 1.

In FIGS. 1 and 2, the zener diode 39 may be moved to a position between the capacitor 42 and the resistor 43 for increasing the charging voltage for the capacitor 51. Although such a move has no effect on the longitudinal isolation for the negative ring party arrangement of FIG. 1, the move will decrease the longitudinal isolation for the positive tip party arrangement shown in FIG. 2 because the zener diode 39 is removed from the series path with the transistor 45 and the diode 47.

Similar arrangements of the ringer isolator-ringing extender can be connected for negative tip party and positive ring party operation by interchanging the tip and ring leads in FIGS. 1 and 2, respectively.

The above-detailed description is illustrative of several embodiments of the invention. The embodiments described herein, together with additional embodiments obvious to those having ordinary skill in the art, are considered to be within the scope of the invention.

What is claimed is:

1. A telephone ringer isolator-ringing extender circuit comprising:

a pair of terminals for receiving an alternating current signal superimposed on a predetermined potential;

a third terminal for connecting with a reference potential;

a pair of parallel connected silicon controlled rectifiers interposed between one of the receiving terminals and the third terminal, the rectifiers being oppositely poled;

a threshold circuit connected between the receiving terminals and further connected to a gate electrode of one of the silicon controlled rectifiers, the threshold circuit arranged for preventing conduction through both rectifiers until a signal having predetermined polarity, magnitude and duration is applied between the receiving terminals triggering initial conduction through the one silicon controlled rectifier, and the pair of silicon controlled rectifiers being arranged for triggering at a low anode-to-cathode potential after initial conduction through the one silicon controlled rectifier.

2. A telephone ringer isolator-ringing extender circuit in accordance with claim 1 wherein the silicon controlled rectifiers are arranged for triggering at zero volt anode-to-cathode potential after initial conduction through the one silicon controlled rectifier.

3. A circuit in accordance with claim 1 wherein a zener diode and a conventional diode are interposed in a gate circuit of the one silicon controlled rectifier for breaking down the zener diode into reverse conduction only in response to a ring signal having the predetermined polarity, magnitude and duration.

4. A circuit in accordance with claim 3 wherein a ringer circuit capacitor of a first telephone is connected in series circuit with the pair of silicon controlled rectifiers between one of the receiving terminals and the third terminal for blocking direct current from being conducted through the ringer.

5. A circuit in accordance with claim 4 wherein a ringer circuit capacitor of a second telephone is connected in series circuit with the pair of silicon controlled rectifiers between the one receiving terminal and the third terminal for blocking direct current from being conducted through the ringer.

6. A multiparty telephone line comprising a plurality of stations, each station having a ringer circuit and a ringer isolator circuit, the ringer circuit of each station having a capacitor and the entire ringer coil arranged electrically in series for blocking direct current from being conducted through the ringer coil, and the ringer isolator circuit of each station including a pair of oppositely poled silicon controlled rectifiers, each rectifier having an anode-cathode path connected electrically in series with the ringer circuit of the same station between one side of the line and ground and one of the rectifiers having a gate connected to another side of the line for enabling conduction through the ringer circuit in a full selective signaling arrangement for four parties.

7. A multiparty telephone line in accordance with claim 6 wherein the ringer isolator circuit of each station comprises a trigger circuit arranged for preventing conduction through the ringer circuit of its associated station until a signal having a predetermined polarity and magnitude is applied to the two sides of the line causing initial conduction through only one of the ringer circuits, and the ringer isolator circuit associated with the initially conducting ringer circuit being arranged for triggering at zero volt between the two sides of the line after initial conduction through its ringer circuit.

* * * * *